Dec. 29, 1931.   F. L. CREAGER   1,838,532
APPARATUS FOR HEAT TREATING
Filed March 21, 1928    2 Sheets-Sheet 1

INVENTOR
Frederick L. Creager
BY Roy M. Eiler
ATTORNEY

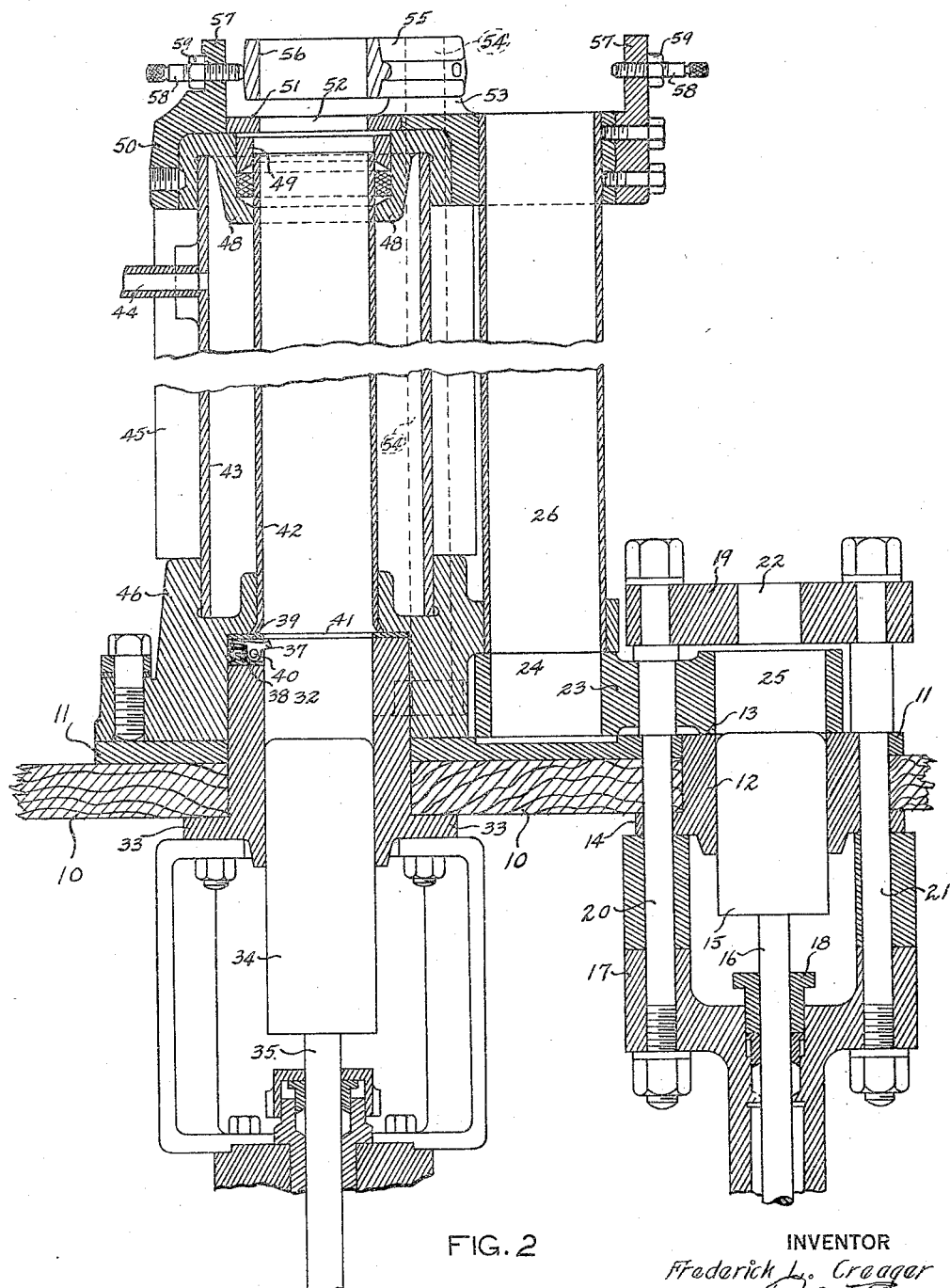

Patented Dec. 29, 1931

1,838,532

UNITED STATES PATENT OFFICE

FREDERICK L. CREAGER, OF SPRINGFIELD, MASSACHUSETTS, ASSIGNOR TO FAIRBANKS, MORSE & CO., OF CHICAGO, ILLINOIS, A CORPORATION OF ILLINOIS

APPARATUS FOR HEAT-TREATING

Application filed March 21, 1928. Serial No. 263,361.

This invention relates to improvements in apparatus for and methods for heat-treating, and especially such apparatus and methods used for the curing of articles of rubber or similar plastic compositions.

The invention has for its principal object, the forming and heat-treating of such parts by a continuous or progressive operation, as distinguished from the prevailing practice of intermittently curing or vulcanizing such articles. Most of the apparatus customarily used for this process, is adapted to produce the finished articles or parts only in intermittent batches. Prevailing apparatus of this sort usually comprises two or more heated platens, associated with a hydraulic press. During the curing period of such machines, the operator is necessarily idle, except as he may be removed for other work.

The present device contemplates as a further object, an efficient, simple, and compact construction, so as to utilize to best advantage, a limited amount of floor space, by the expedient of placing the heating element or chamber in a vertical, instead of the usual horizontal position. The invention may, however, be equally well embodied in a device having a heating chamber in other than a vertical position.

A further object of the present invention is to assemble the parts of the apparatus on a single table or support, with the necessary control levers for the apparatus disposed in locations easily accessible to the operator.

A still further object of the invention is to construct a heat-treating or curing apparatus involving a process in which the conditions of treatment are, to a great extent, standardized and maintained independently of personal factors due to the operator of the apparatus or machine.

Other objects and advantages will appear from the drawings and the following detailed description of a preferred embodiment of the invention.

It will, of course, be understood that the presently described example is only a single embodiment of this subject matter, and that substantial alterations may be made without departing from the spirit and full scope of the invention.

Figure 1:
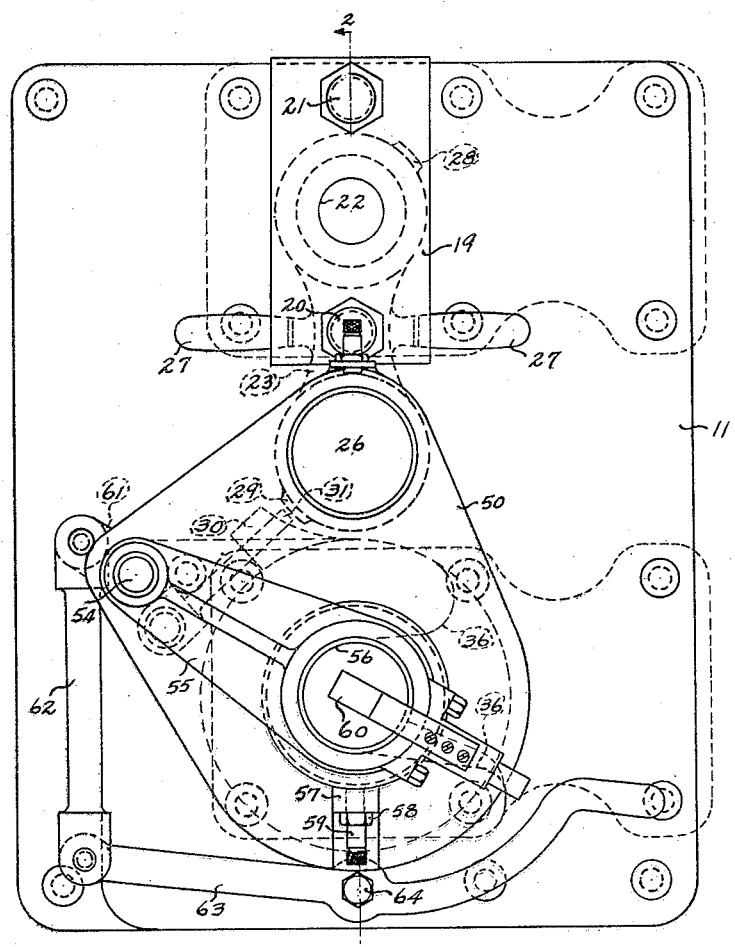
Figure 3:
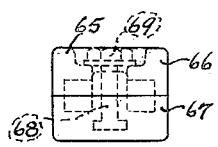

In the drawings Fig. 1 is a plan view of the general assembly; Fig. 2 is a sectional elevation taken along the line 2—2 of Fig. 1; Fig. 3 is a side elevation of a type of mold preferred for the curing of small rubber articles or parts.

Referring to the drawings by numerals, 10 designates a base or supporting table of any suitable form, with which is associated a substantially flat cover plate 11 of some suitable wear resisting material. Upon and below the table, the various parts, such as a press cylinder, curing cylinder and the like, are supported.

The press cylinder 12 is of any suitable form, and has an upper face 13 flush with the upper face of the plate 11 for a reason which will hereinafter appear. A flange 14 abuts the under side of the table top and aids in positioning the member 12, and in determining the exact height of face 13. Operating in the cylinder 13 is a plunger 15 connected to a rod 16. The opposite end of the rod 16 is operatively connected to a pressure piston (not shown) contained in a suitable pressure cylinder (not shown). These latter may be of any suitable type and are well known in the art. Part of the frame structure 17 associated with the pressure cylinder, is shown attached to the table. A stuffing box 18 is preferably disposed between the pressure cylinder and the plunger 15, to confine the fluid and fluid pressure to the pressure cylinder. Suitable controls are provided to control admission of fluid to the pressure cylinder. The plunger 15 is so related to the rod 16 that when in its lowest position in Fig. 2, the upper face of the plunger 15 is directly in line with the upper face of the plate 11, for a purpose that will appear hereinafter. The plunger 15 in its upward movement, is adapted to apply a substantial pressure to any article, such as a mold, inserted between its upper face and a stop member 19.

The stop member 19, preferably a flat abutment, is rigidly secured to shouldered portions of bolts 20 and 21, which extend through the table to support the described piston and plunger assembly, as well as to secure the stop member 19. The bolts 20 and 21 are designed to withstand a substantial tension, and to hold the stop member 19, substantially stationary and at a fixed distance from the table 10. An opening 22 is provided in the member 19, for access to a mold or the like, for example to lock together a two part mold, while positioned above the plunger 15.

An arm 23 is free to rotate, across the table top, about a fixed fulcrum formed by the bolt 20 projecting through the midpoint of the arm. The end portions of the arm contain bores 24 and 25. These bores are of substantially equal size, with their centers so disposed about the fulcrum point that a circle swung from this point, passes through the center of each of the bores 24 and 25, the cylinder bore 12 and the bore of an adjacent vertical return chute or cylinder 26. Referring to Fig. 2, when the arm 23 is in the position shown, one end of the arm and its bore, register with the bore of the cylinder 12, while the bore in the opposite end of the arm is in register with cylinder bore 26. Only a slight clearance is provided between the arm and the bottom of the latter cylinder, for a purpose that will hereinafter appear. Handles 27 are attached to the mid portion of the arm 23, for convenience in rotating this member. The arm 23 is adapted to be locked in each of its several operative positions by a suitable locking or positioning device, which comprises boss members 28 and 29 on the arm, and a companion boss 30, disposed on some suitable stationary portion of the assembly. A pin 31 is operable in and out of an opening in boss 30, and is adapted to register with receiving openings therefor, in bosses 28 and 29, as appear in dotted lines in Fig. 1.

The heat-treating or curing chamber is best shown in Fig. 2, and comprises a cylinder 32, preferably of substantially the same diameter as cylinder 12, and having a lower portion adapted to be clamped beneath the table, as by a flange 33. Operating in the cylinder is a plunger 34, connected to a rod 35, adapted to transmit an intermittent reciprocating movement thereto, by means of a fluid pressure piston (not shown). A suitable foot lever arrangement (not shown), may be provided for control of the plunger 34. Through one wall of the cylinder 32, at a point convenient to the press cylinder, is provided an opening 36. This opening is associated, and coincides with, a similar opening through the base member or support for the curing chamber. The bottom of the opening 36 is substantially level with the face of the plate 11, and the upper face of the plunger 34, when the plunger is in its lowest position. This opening is provided, in the present example, for introducing the articles to be heat-treated or cured, into the lower portion of the heating chamber.

Disposed near the upper limit of travel of plunger 34 and projecting into its path, is a spring lock. An arm 37 of the lock is urged into the path of the plunger 34 by means of a tension spring 38 acting against the arm 39 of the latch, which is pivoted at 40. As a mounting for the latch a disc 41 is interposed above the cylinder 32, and encases the locking device in the cylinder wall. A central bore in the disc serves as a continuation of the cylinder bore 32, and that of a heating or curing chamber 42.

The latter chamber is surrounded by a steam jacket 43, which is arranged to receive a heating medium such as steam, through a supply pipe 44. A return or drain pipe (not shown) provides for circulation through the jacket. An insulating material 45 is preferably applied about the entire jacket 43, for the purpose of reducing heat radiation and loss to the atmosphere.

Enclosing and supporting the lower end of the steam jacket 43, and supporting the curing chamber 42 as well as the tube 26, is the support base or bracket 46, by which the chamber 42 and related parts are substantially fastened to the table.

The top portion of the jacket 43 is enclosed by a cap member 48, which includes one portion of a stuffing box 49 around this end of the curing chamber, to effect a steam tight joint at this point. An additional cap element 50 surrounds and is rigidly secured to the member 48, and also surrounds the upper end of the cylinder 26. A plate 51 is tightly secured in the member 50 and comprises a bore 52 that is a continuation of the bore of the chamber 42. The upper face of the member 50 is a substantially smooth plane surface with the exception of a boss 53 which forms a bearing for a vertical shaft 54.

An arm 55 has one of its ends keyed to the shaft 54, so that rotation of the shaft 54 rotates the arm. The other end of the arm 55 is provided with an opening preferably of a size substantially equal to the bore 42 of the heating chamber, and the bore of tube 26. The fulcrum point 54 is situated substantially in such a position, that, using this point as a center, and striking a radius through the center of the bore 56 of the arm, the circle will pass directly through the centers of the cylinders 42 and 26. The movement of the arm 55 is restricted by stop members 57, with which are associated set screws 58 and lock nuts 59. The screws 58 are so adjusted that the bore 56 is definitely positionable, directly over either of cylinders 26 or 42. A stop member 60 is fixedly attached above the bore 56 of the arm, to prevent delivery therefrom, of more than a single article or unit, at a time.

Rotation of the arm 55 is provided for by an arrangement for rotating the lower end of shaft 54. In Fig. 1 it will be seen that the lower end of shaft 54 is journaled in a boss formed on the bracket 46. With shaft 54 is connected a link 61. A link 62 pivotally connects a hand lever 63 and the link 61. The hand lever is arranged to turn about a fixed pivot 64. It will be seen from Fig. 1 that an inward movement of hand lever 63 will rotate the shaft 54, counter-clockwise (in the figure) and swing the arm 55 until its outer face impinges with one of the set screws 58, and the opening 56 is directly in line with tube 26.

In Fig. 3 is shown a preferred form of mold, designated generally as 65. This mold is slightly smaller in diameter than the bores of each of the various cylinders. The mold may be of any suitable type, but by preference it comprises the halves 66 and 67, arranged to be secured together by a bolt 68 and a nut 69. The inner portion of the molds 66 and 67, are formed or cut to produce the desired shape or form of the finished, cured product. It will be understood that appreciable changes may be made in the described form of mold, and that molds eliminating the center bolt may be used without limiting the scope or operating principles of the present invention, which may in fact be practiced without using molds of any form.

In operation, the forming and curing process is adapted to provide a continuous or progressive production of finished articles, as will appear from the description of the processes involved.

The halves of the mold are filled with rubber or other material to be heated or vulcanized. The mold is then loosely assembled, placed in one of the bores of the arm 23, with the nut adjacent the opening 22, and with the mold over the plunger 15. When the mold is in this position, the arm 23 is locked in place, by the pin 31, registering in a hole in the boss 28, as appears in Fig. 1. The plunger is urged upwardly by the pressure operated piston above described, thus compressing the mold against the stop member 19. The material in the mold is then compressed, and the halves of the mold brought together. A wrench of any suitable type, say a socket wrench, is inserted in the opening 22 of the stop member, and the parts of the mold are secured together. The plunger 15 is released, and moves away from the mold to its lowest position.

The arm 23 and the mold containing the compressed material is then rotated away from the cylinder, and plunger 15, and the mold 65 removed.

The plunger 34 of the curing assembly being in a position to receive it, the mold, with the nut upward, is moved over the table through the passage 36 into the cylinder just over the plunger. A foot pedal or equivalent control causes the plunger 34 with the mold above it, to rise in the cylinder, causing the lock arm 37 to recede into the cylinder wall, against the pressure of spring 38. The plunger continues to rise to a point slightly above the locking device. The plunger 34 is then released and travels downwardly. The mold tends, by gravity, to follow the plunger, but the arm 37, being urged outwardly into the cylinder by the spring, projects into the bore of member 32, to restrict the downward movement of the mold.

The above set of operations being repeated, each succeeding mold introduced into the curing chamber, causes the preceding mold to rise therein, a distance depending upon the depth or thickness of each of the molds or the separate articles, and upon the stroke of plunger 34. Due to the heat applied to the jacket of the curing chamber, the molds are heated uniformly as they pass upwardly in the cylinder 42. The extent of cure of the material in the mold, is determined by the temperature of the jacket, and the time required for a given mold to pass through the cylinder, the latter element depending on the length of the chamber and the time required by the operator for preparing the mold, unit or article.

When the chamber becomes filled with the molds or articles to be heat treated, the mold or article, next introduced into the bottom, advances all of the molds under treatment and causes the top mold to rise into the bore 56 of the arm 55, which is positioned directly over the curing chamber.

The hand lever 63 is then moved to the right (Fig. 1) and through its connection with the shaft 54, the arm 55 carrying the mold, is rotated to a position just above the bore 26 of the return tube. The mold then drops by gravity to the bottom of this tube. The arm 23 being locked in position to compress another mold in the cylinder 13, the other bore of the arm 23 is aligned with the bore of the return tube. As but a slight clearance is provided between the arm and the bottom of the tube 26, the mold as it drops in tube 26, traps the air beneath it sufficiently to cushion the impact otherwise occurring between the mold and the table. The hot mold in the bore of the arm 23, in the bottom of tube 26, is brought directly over the plunger 15, by suitably rotating the arm 23, and the plunger then used to hold the mold, while the locking device is released and the finished product removed. During transfer of the mold from tube 26 to a position above the plunger 15, the mold is prevented from falling through the bores 24 and 25 since these numbers slidably engage the plate 11 throughout their range of movement. In lieu of this, the hot mold may be removed directly from the arm 23 immediately after it has dropped to the table, and then placed in a quenching or cooling bath. A number of the molds may be left in the bath, and a cold mold removed and unlocked as described above. When the apparatus is used for curing rubber, the quenching operation prevents the rubber from expanding or distorting after removal from the mold, and is especially advisable when a finished product of exact size is required.

From the above description of operation of the apparatus, it is seen that a finished mold drops out of the chamber as each mold of untreated material is introduced. As a consequence, a continuous production is maintained, and the operator kept continuously occupied, and the time-output per man is materially increased.

It will also be seen that, once the length and temperature of the heating or curing chamber have been determined upon, and the required operator's time per unit or mold, is ascertained and standardized, that the process and product will be characterized by great uniformity.

The invention has thus far been described by reference to a machine for curing molded rubber parts or articles. It is, of course, understood that with or without modifications, the apparatus may be adapted for other kinds of heat-treatment, and that the units of material need not, in all cases, be enclosed in molds.

A process has been described in which the articles or molds proceed from bottom to top of a vertical heating chamber. The apparatus is capable of obvious modifications to permit a reverse travel of the molds or units to be treated, or to permit their being advanced horizontally through the curing chamber.

With slight modifications, the heating or curing chamber may be disposed in other than the described vertical position.

The embodiment of the invention herein described has proven in experiment to be efficient and practical, especially for standardized products, and to effect a great saving in cost of the finished articles, due to the continuity of production.

I claim as my invention:

1. In a continuous heat-treating apparatus for molded units, a vertical tubular heating chamber, a hydraulic piston disposed below and in alignment with said chamber, adapted to coact with a unit or article to be treated, to move progressively all of such units or articles under treatment upwardly through said heating chamber, a second tubular chamber parallel to and adjoining said heating chamber, a horizontally swingable conveyor pivoted between the upper ends of said chambers and adapted for transferring the units from one of said chambers to the other thereof, a second hydraulic piston arranged for movement in a line parallel with said chambers, and a second swingable conveyor adapted to transfer the units from said second chamber to the said second piston.

2. In an apparatus adapted for the continuous vulcanization of separate, molded articles or units, an elongate vertically disposed heating chamber, a return tube parallel and adjacent to the heating chamber, a hydraulic piston aligned with and disposed below the chamber, adapted to introduce such articles thereto, and to effect a progressive movement of the articles or units under treatment through the chamber, a pivoted conveying element for moving the units away from the upper or discharge end of the chamber to the upper end of the return tube, a second pivoted conveying element associated with the delivery end of said tube, and hydraulic-holding means for the treated articles, in the path of movement of said second conveying element.

3. A vulcanizing apparatus comprising a vertical tubular curing chamber having receiving and discharge openings on opposite ends, a fluid operated piston disposed below the chamber, adapted to effect a progressive, unidirectional movement of articles and units under treatment upwardly through the curing chamber, a return chamber disposed in parallel adjacence with the curing chamber, a pair of horizontally swingable conveying arms disposed near opposite ends of the chambers, each having a portion movable into alignment with the return chamber, and a fluid operated press disposed out of alignment with each of said chambers, and in the path of the lowermost conveying arm.

4. A vulcanizing apparatus comprising a vertical, jacketed heating chamber adapted to contain a plurality of contiguously associated, molded articles or units, a press exterior to said chamber, and aligned therewith, said press adapted to coact with one of said articles or units, to introduce and produce a progressive movement of said articles or units upwardly in said chamber, a pivoted conveying element for receiving the cured units at the top of said chamber, a tubular chute parallel to and alongside of said chamber, said chute having its upper end in the path of movement of said conveying element, a second press adapted for handling vulcanized units, and means for conveying the units from the lower end of the chute to the last named press.

5. A vulcanizing apparatus comprising a vertical tubular heating chamber adapted to contain a plurality of adjacent articles or units for treatment in molds, a plunger at the lower end of, and exterior to, said chamber adapted to coact with one of said units, to expel another of such units from the opposite end of said chamber, a table at the entrance to said chamber, a return tube disposed parallel to and alongside the heating chamber and adapted to receive the cured units, for delivery to said table, said heating chamber and return tube being of an internal cross section to conform closely to the molds received thereby, a mold press carried by the table, a horizontally movable conveyor pivoted intermediate the chamber and tube and movable across the upper ends thereof, means for manually operating said conveyor from a point near the level of the table, and a second conveyor element adapted to transfer the units from the return tube to said press.

6. An apparatus for continuously vulcanizing molded rubber articles, in individual molds, the apparatus including a vertical heater of tubular, jacketed construction, a plunger external to the heater, for progressively and unidirectionally moving a procession of said articles through the heater, out of contact with the heating medium, a tubular return chute for the vulcanized articles, disposed in close parallel adjacence with the heater, a table constituting a mounting for said heater and chute, a pivoted conveyor element having a plurality of bores therein, adapted to transfer the cured articles from the heater to said chute, a lever disposed adjacent the table, for controlling said conveyor, a second pivoted conveyor element, carried by the table and arranged to receive the cured articles from said chute, the lower end of said chute and said second conveyor element having a cross section approximating that of the individual molds and coacting therewith to constitute pneumatic means for checking the movement of the cured articles near the end of the chute, and a press, mounted on said table and disposed to receive the cured articles from said second named conveyor.

FREDERICK L. CREAGER.